(12) United States Patent
Kawai

(10) Patent No.: US 9,554,000 B2
(45) Date of Patent: Jan. 24, 2017

(54) SERVER AND COMMUNICATION SYSTEM INCLUDING THE SAME

(71) Applicant: Brother Kogyo Kabushiki Kaisha, Nagoya-shi, Aichi-ken (JP)

(72) Inventor: Sunao Kawai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/086,512

(22) Filed: Mar. 31, 2016

(65) Prior Publication Data

US 2016/0295037 A1 Oct. 6, 2016

(30) Foreign Application Priority Data

Mar. 31, 2015 (JP) .................................. 2015-073953

(51) Int. Cl.
*H04N 1/00* (2006.01)
*H04N 1/44* (2006.01)
(Continued)

(52) U.S. Cl.
CPC .......... *H04N 1/00204* (2013.01); *H04L 67/02* (2013.01); *H04N 1/00307* (2013.01);
(Continued)

(58) Field of Classification Search
CPC .............. H04N 1/00204; H04N 1/4413; H04N 1/00344; H04N 1/32101; H04N 1/00307; H04N 1/00464; H04N 2201/0094; H04L 67/02
(Continued)

(56) References Cited

U.S. PATENT DOCUMENTS 8,270,020 B2 9/2012 Abe
2009/0303531 A1 12/2009 Abe
(Continued)

FOREIGN PATENT DOCUMENTS

JP 2009-294931 A 12/2009

OTHER PUBLICATIONS

Wi-Fi Alliance Technical Committee P2P Task Group, "Wi-Fi Peer-to Peer (P2P) Technical Specification", Version 1.1, pp. 1-159, 2010.

*Primary Examiner* — Allen H Nguyen
(74) *Attorney, Agent, or Firm* — Banner & Witcoff, Ltd.

(57) ABSTRACT

A server includes a controller and an interface for communicating with image processing devices and an information processing device. The controller performs: obtaining, from a first image processing device, first identification information about the first image processing device and a first particular code input to the first image processing device; determining whether at least one code in a storage contains the obtained first particular code; transmitting first corresponding information corresponding to the first particular code to the first image processing device when the at least one code contains the obtained first particular code; receiving the first corresponding information provided from the first image processing device to the information processing device and first user account information input to the information processing device; and registering the received first user account information and the first identification information identified by the received first corresponding information, into the storage in association with each other.

11 Claims, 10 Drawing Sheets

(51) Int. Cl.
*H04N 1/32* (2006.01)
*H04L 29/08* (2006.01)

(52) U.S. Cl.
CPC ..... *H04N 1/00344* (2013.01); *H04N 1/00464* (2013.01); *H04N 1/32101* (2013.01); *H04N 1/4413* (2013.01); *H04N 2201/0094* (2013.01)

(58) Field of Classification Search
USPC .............................................. 358/1.13, 1.15
See application file for complete search history.

(56) References Cited

U.S. PATENT DOCUMENTS

2014/0358681 A1* 12/2014 Satoh ................ G06Q 30/0255
705/14.53
2015/0248258 A1* 9/2015 Ding ..................... G06F 3/1222
358/1.15
2015/0277837 A1* 10/2015 Oguro ................... G06F 3/1243
358/1.13

\* cited by examiner

FIRST EMBODIMENT
CASE B1

SERVER AND COMMUNICATION SYSTEM INCLUDING THE SAME

CROSS REFERENCE TO RELATED APPLICATION

The present application claims priority from Japanese Patent Application No. 2015-073953, which was filed on Mar. 31, 2015, the disclosure of which is herein incorporated by reference in its entirety.

BACKGROUND

Technical Field

The following disclosure relates to a server for registration of user account information and to a communication system including the server.

Description of the Related Art

There is known a technique in which user account information and identification information unique to an image processing device are associated with each other and registered into a server. This technique uses a one-time password to associate the user account information and the identification information.

SUMMARY

In one example of such a technique, when an image processing device is registered into a server, a user needs to access the server, make a registration of user account information, and input identification information unique to the image processing device. To register the identification information unique to the image processing device, the user has to operate the image processing device to look up its identification information (e.g., a model name and a serial number) and input the identification information, resulting in low usability. Accordingly, an aspect of the disclosure relates to a technique for registering user account information and identification information unique to an image processing device, into a server.

In one aspect of the disclosure, a server includes: a communication interface configured to communicate with a plurality of image processing devices and an information processing device over a network; a storage configured to store at least one code; and a controller configured to perform: obtaining first identification information and a first particular code from a first image processing device, the first identification information identifying the first image processing device that is one of the plurality of image processing devices, the first particular code being input to the first image processing device by a user; determining whether the obtained first particular code is identical to one of the at least one code stored in the storage; in response to determining that the obtained particular code is identical to one of the at least one code, transmitting first corresponding information to the first image processing device, the first corresponding information corresponding to the first particular code; receiving first user account information and the first corresponding information from the information processing device, the first user account information being input to the information processing device by the user, the first corresponding information having been transmitted from the first image processing device to the information processing device; and registering the received first user account information and the first identification information identified by the received first corresponding information, into the storage in association with each other.

In one aspect of the disclosure, a communication system includes: a server; and a first image processing device. The server includes: a communication interface configured to communicate with a plurality of image processing devices and an information processing device over a network, the plurality of image processing devices including the first image processing device; a storage configured to store at least one code; and a controller configured to perform: obtaining first identification information and a first particular code from the first image processing device, the first identification information identifying the first image processing device, the first particular code being input to the first image processing device by a user; determining whether the obtained first particular code is identical to one of the at least one code stored in the storage; in response to determining that the obtained particular code is identical to one of the at least one code, transmitting first corresponding information to the first image processing device , the first corresponding information corresponding to the first particular code; receiving first user account information and the first corresponding information from the information processing device, the first user account information being user account information that is input to the information processing device by the user, the first corresponding information having been transmitted from the first image processing device to the information processing device; and registering the received first user account information and the first identification information identified by the received first corresponding information, into the storage in association with each other.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

First Embodiment

Configuration of Communication System

Figure 1:
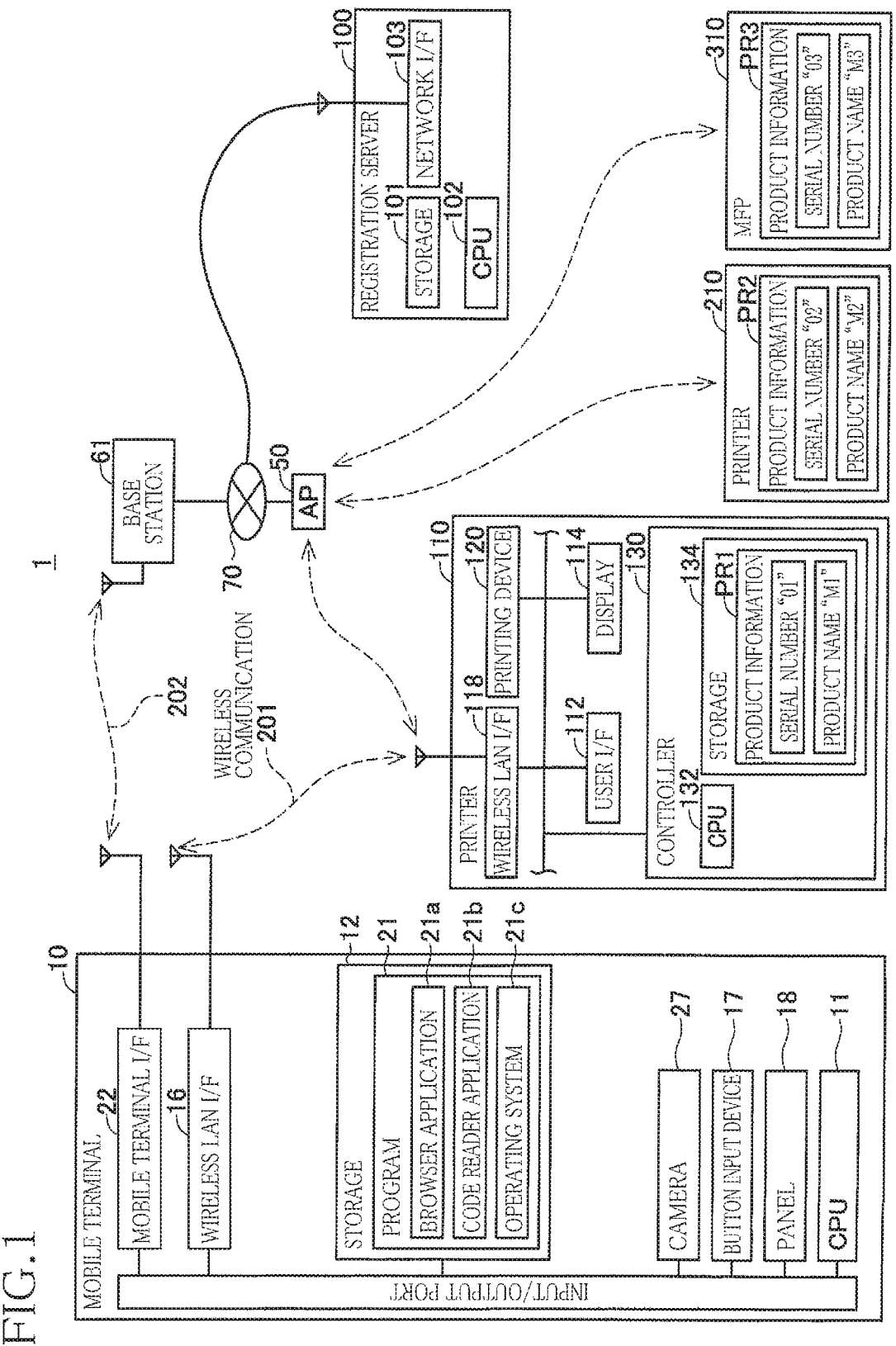
FIG. 1 is a block diagram illustrating a communication system.

Hereinafter, there will be described embodiments by reference to the drawings. FIG. 1 illustrates a communication system 1 according to embodiments. The communication system 1 includes a mobile terminal 10 as one example of an information processing device, a printer 110 as one example of a first image processing device, a printer 210 as one example of a second image processing device, a multi-function peripheral (MFP) 310 as one example of a third image processing device, a registration server 100, a base station 61, and an access point (AP) 50. The registration server 100 is capable of communicating with the mobile terminal 10 via Internet 70 and the base station 61 and communicating with the printers 110, 210 and the MFP 310 via the AP 50.

Configuration of Mobile Terminal 10

The mobile terminal 10 employs Android® (registered trademark of Google Inc.) as a platform. The mobile terminal 10 includes a CPU 11, a storage 12, a wireless local area network (LAN) interface 16, a button input device 17, a panel 18, a mobile terminal interface 22, and a camera 27. The CPU 11 controls functions according to programs stored in the storage 12. The CPU 11 executes various processings by reading the programs.

The storage 12 stores a program 21. It is noted that the storage 12 may be constituted by combinations of a random access memory (RAM), a read only memory (ROM), a flash memory, and a hard disc drive (HDD). The storage 12 may be a storage medium readable by a computer. Examples of the storage medium readable by the computer include a non-transitory medium such as the ROM, the RAM, the flash memory, and the hard disk. Electric signals for transferring programs downloaded from servers on the Internet are not the non-transitory medium.

The program 21 includes a browser application 21a, a code reader application 21b, an operating system (OS) 21c. The OS 21c is an Android OS. The browser application 21a and the code reader application 21b are Android applications.

The browser application 21a is an application for displaying web data received from the registration server 100, on the panel 18.

The code reader application 21b is an application for obtaining two-dimensional code data corresponding to a two-dimensional code taken by the camera 27. One example of the code is a QR code® (registered trademark of Denso Wave).

The OS 21c is a program for providing common services for the browser application 21a and the code reader application 21b. The OS 21c manages transfers of data between the browser application 21a and the code reader application 21b.

The OS 21c executes various kinds of processings based on various kinds of data received via the wireless LAN interface 16 and the mobile terminal interface 22 and based on various kinds of data obtained by the code reader application 21b.

The mobile terminal interface 22 is an interface for wireless communication 202 with the base station 61. The mobile terminal interface 22 includes IC chips and communication circuits. The wireless communication 202 may be wireless communication according to cellular standards such as 3G and 4G. The mobile terminal interface 22 enables the mobile terminal 10 to be connected to the Internet 70 via the base station 61.

The wireless LAN interface 16 is an interface for wireless communication 201 according to Wi-Fi Direct® (registered trademark of Wi-Fi Alliance). The wireless LAN interface 16 includes IC chips and communication circuits. Details of the technology of Wi-Fi Direct are described in "Wi-Fi Peer-to-Peer (P2P) Technical Specification Version1.1" created by Wi-Fi Alliance. The wireless LAN interface 16 is also used for wireless communication according to Wi-Fi® (registered trademark of Wi-Fi Alliance) via the AP 50.

The button input device 17 includes keys for execution of the functions of the mobile terminal 10. The button input device 17 may be provided in the form of a touch screen superposed on the panel 18. The panel 18 displays various kinds of functional information of the mobile terminal 10. The camera 27 is used to take an object to create image data.

Configurations of Printers 110, 210

The printer 110 is a peripheral device capable of performing printing, that is, the printer 110 is a peripheral device of a device such as a personal computer (PC). The printer 110 includes a user interface 112, a display 114, a wireless LAN interface 118, a printing device 120, and a controller 130. The devices 112-130 are connected to a bus.

The user interface 112 includes a plurality of keys. Users can operate the user interface 112 to instruct the printer 110. The display 114 displays various kinds of information. The user interface 112 may be provided in the form of a touch screen superposed on the display 114. The printing device 120 is a printing mechanism such as an ink-jet printer and a laser printer.

The controller 130 includes a CPU 132 and a storage 134. The CPU 132 is a processor which executes various processings according to programs, not illustrated, stored in the storage 134. The storage 134 is constituted by devices such as a RAM and a ROM. The storage 134 may be a storage medium readable by a computer like the storage 12.

The storage 134 stores product information PR1 (as one example of first identification information). The product information PR1 relates to the printer 110 and contains a serial number "01" and a product name "M1". The serial number "01" is an identification number unique to the printer 110. The product name "M1" is a name of a model of the printer 110.

The printer 210 is similar in configuration to the printer 110. A storage, not illustrated, of the printer 210 stores product information PR2 (as one example of second identification information). The product information PR2 relates to the printer 210 and contains a serial number "02" and a product name "M2". The serial number "02" is an identification number unique to the printer 210. The product name "M2" is a name of a model of the printer 210.

Configuration of MFP 310

The MFP 310 is a peripheral device capable of performing various operations in addition to printing, that is, the MFP 310 is a peripheral device of a PC. In addition to the configuration of the printer 110, the MFP 310 includes a reading device, not illustrated. The reading device is a reading mechanism which reads a two-dimensional code to obtain two-dimensional code data corresponding to the two-dimensional code. A storage, not illustrated, of the MFP 310 stores product information PR3 (as one example of third identification information). The product information PR3 relates to the MFP 310 and contains a serial number "03" and a product name "M3". The serial number "03" is an identification number unique to the MFP 310. The product name "M3" is a name of a model of the MFP 310.

Configuration of Registration Server 100

The registration server 100 is a server on the Internet 70. The registration server 100 may be provided by a vendor of each of the printers 110, 210 and the MFP 310. The registration server 100 includes a storage 101, a CPU 102, and a network interface 103 as one example of a communication interface. The CPU 102 is a processor which executes various processings according to programs, not illustrated, stored in the storage 101. The storage 101 is a storage area for storing various kinds of data such as HTML data and image data. The registration server 100 provides the data stored in the storage 101 over the Internet 70 in response to a request transmitted from client software such as the browser application 21a installed in the mobile terminal 10.

The network interface 103 is connected to the Internet 70. The registration server 100 can use the network interface 103 to communicate with the mobile terminal 10 via the base station 61 and communicate with the printers 110, 210 and the MFP 310 via the AP 50. Information Registered in Storage 101 of Registration Server 100

Figure 2:
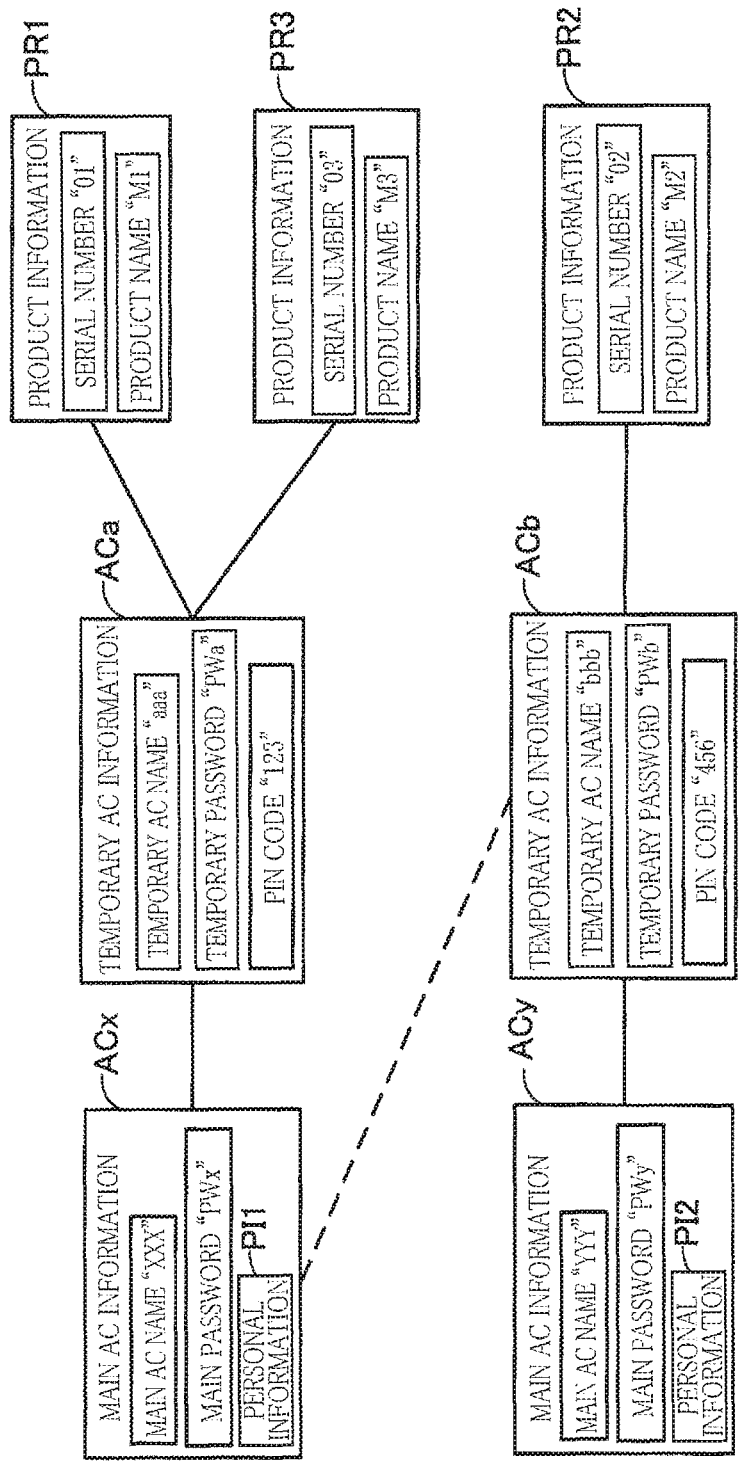
FIG. 2 is a view illustrating one example of each information registered in a storage of a registration server.

There will be next explained one example of information registered in the storage 101 of the registration server 100 with reference to FIG. 2. Examples of information stored in the storage 101 include main account information ACx (as one example of first user account information), main account information ACy (as one example of second user account information), temporary account information ACa, ACb, and the product information PR1-PR3.

The main account information ACx relates to a user of the printer (or the MFP) and contains a main account name "XXX", a main password "PWx", and personal information PI1. The main account name "XXX" and the main password "PWx" are required for a login to the registration server 100. The personal information PH contains information such as a name of a user, an address, contact information, and a method of payment for services provided by the registration server 100. The main account information ACy contains a main account name "YYY", a main password "PWy", and personal information PI2. Definitions of the main account name "YYY", the main password "PWy", and the personal information PI2 are similar to those of the main account name "XXX", the main password "PWx", and the personal information PI1.

Each of the temporary account information ACa, ACb is temporary account information. The temporary account information ACa contains a temporary account name "aaa", a temporary password "PWa", and a PIN code "123" (as one example of a first particular code). The temporary account name "aaa" and the temporary password "PWa" are required for a login to the registration server 100. The PIN code "123" is information required for registration of account information and product information about the printer into the storage 101 in association with each other. The temporary account information ACb contains a temporary account name "bbb", a temporary password "PWb", and a PIN code "456". Definitions of the temporary account name "bbb", the temporary password "PWb", and the PIN code "456" are similar to those of the temporary account name "aaa", the temporary password "PWa", and the PIN code "123".

In FIG. 2, the main account information ACx, the temporary account information ACa, and the product information PR1, PR3 are registered in association with each other, and the main account information ACy, the temporary account information ACb, and the product information PR2 are registered in association with each other. Thus, one main account information, one temporary account information, and two or more product information may be registered in association with each other. It is noted that, as indicated by the broken line in FIG. 2, the temporary account information ACb may be registered in association with the main account information ACx instead of with the main account information ACy.

Case A

Figure 3:
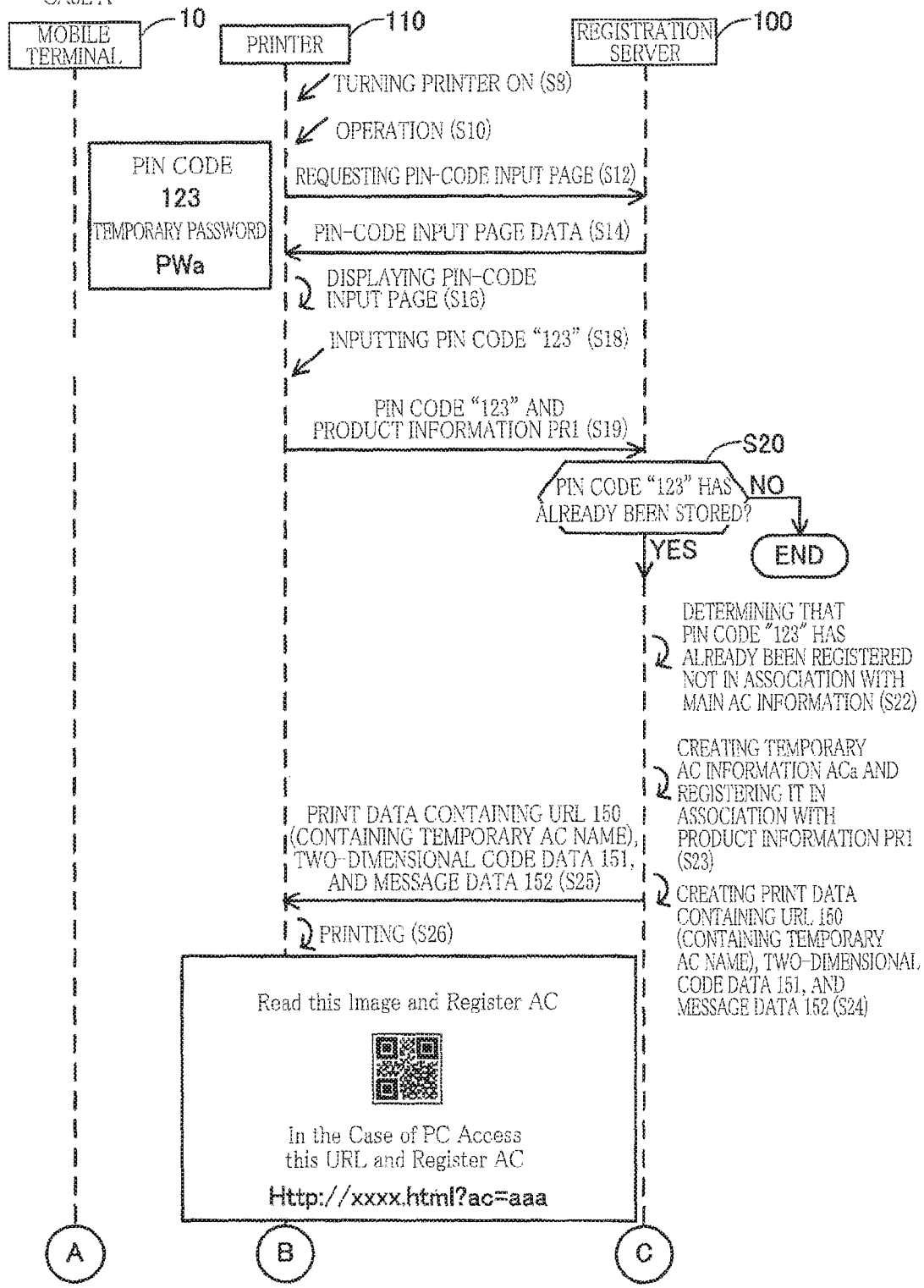
FIG. 3 is a sequence diagram illustrating a case A in which product information about a first printer is registered.
Figure 4:
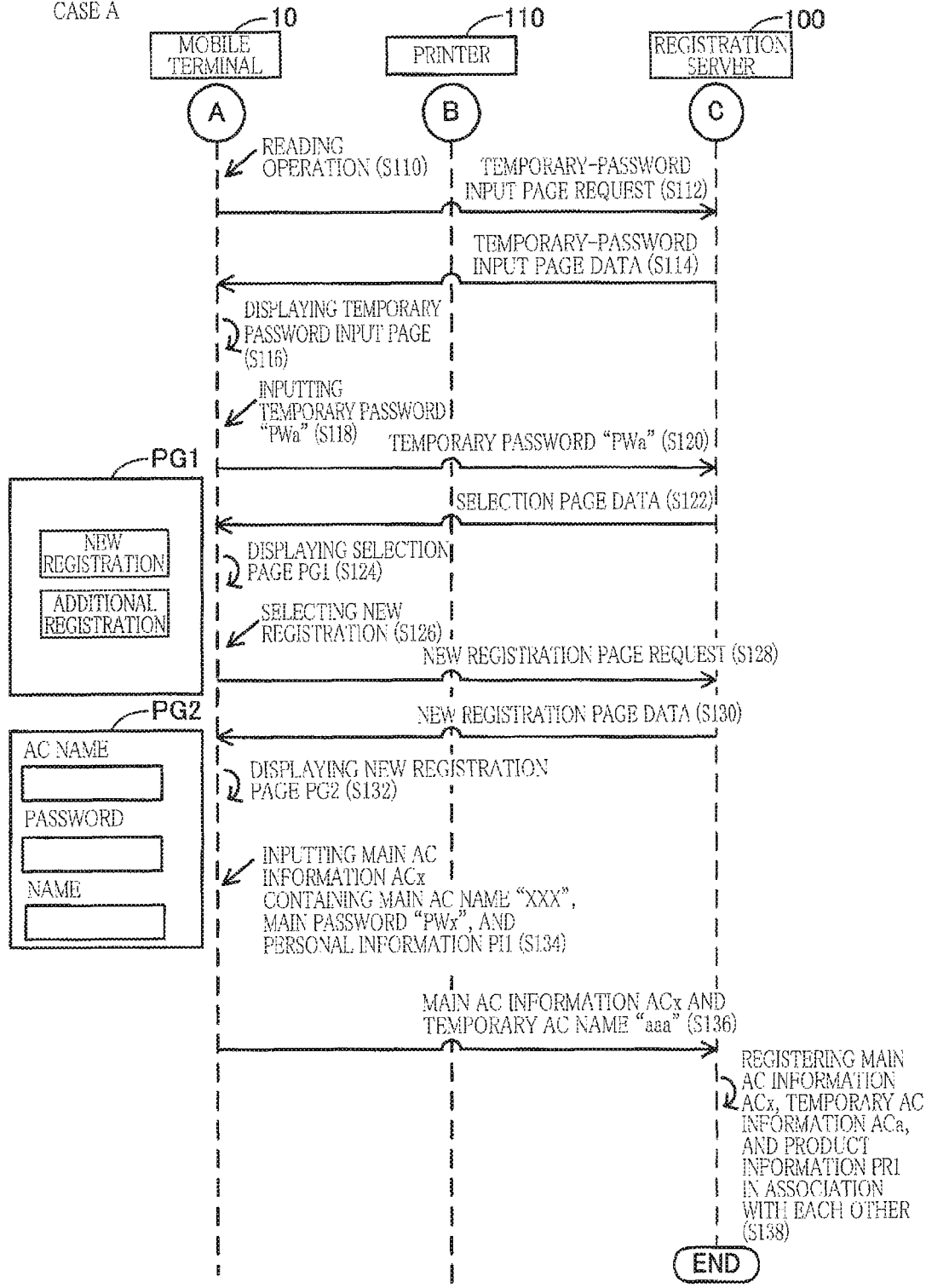
FIG. 4 is a sequence diagram continued from FIG. 3.

There will be next explained, with reference to FIGS. 3 and 4, a case A in which the main account information ACx and the product information PR1 about the printer 110 are registered in association with each other. In the initial state of the present case, the storage 101 of the registration server 100 stores the PIN codes "123", "456" but does not store the other information such as account information. A user has a card on which the PIN code "123" and the temporary password "PWa" are described. The user can obtain the card at a store of the printer 110, for example. The card may be placed in the store such that everyone can freely take the card, may be distributed only to a purchaser of the printer 110 and may be included with the printer 110.

At S8 in FIG. 3, the user turns on the printer 110. At S10, the user operates the user interface 112 of the printer 110 to request PIN-code input page data. The PIN-code input page data represents a PIN-code input page containing an image for input of the PIN code.

At S12, the printer 110 transmits a PIN-code input page request to the registration server 100. Upon receiving the PIN-code input page request from the printer 110, the registration server 100 at S14 transmits the PIN-code input page data to the printer 110. At S16, the printer 110 displays the PIN-code input page on the display 114.

At S18, the user inputs the PIN code "123" described on the card to the user interface 112 of the printer 110.

At S19, the printer 110 reads the product information PR1 containing the serial number "01" and the product name "M1" from the storage 134 and transmits the PIN code "123" and the product information PR1 to the registration server 100.

Upon receiving the PIN code "123" and the product information PR1 from the printer 110, the registration server 100 at S20 determines whether any of the two PIN codes stored in the storage 101 matches the PIN code "123" transmitted with the received product information PR1. In the present case, a positive decision (YES) is made at S20 because one of the two PIN codes stored in the storage 101 coincides with the PIN code "123". When none of the two PIN codes stored in the storage 101 coincides with the PIN code "123", a negative decision (NO) is made at S20, and the process in FIG. 3 ends.

At S22, the registration server 100 determines that the PIN code "123" has already been registered not in associated with the main account information. At S23, the registration server 100 creates the temporary account name "aaa" and the temporary password "PWa" and uses the temporary account name "aaa", the temporary password "PWa", and the stored PIN code "123" to create the temporary account information ACa (as one example of first corresponding information). In a modification, the registration server 100 may create the temporary account name "aaa" and the temporary password "PWa" at issue of the card and store them into the storage 101 in advance. The registration server 100 may at S22 read the stored temporary account name "aaa" and temporary password "PWa". At S23, the registration server 100 registers the created temporary account information ACa and the product information PR1 into the storage 101 such that the created temporary account information ACa and the product information PR1 are associated with each other. At S24, the registration server 100 creates print data containing a URL 150, two-dimensional code data 151 as one example of encoded data, and message data 152. The URL 150 is data which indicates a location of a web page on the Internet 70, which web page is for input of main account information. The URL 150 contains the temporary account name "aaa". Specifically, the URL 150 contains a query string "ac=aaa" representing the temporary account name "aaa". The two-dimensional code data 151 is data having the same information as contained in the URL 150. The message data 152 contains data representing a message for prompting the user to operate the mobile terminal 10 to read the two-dimensional code represented by the two-dimensional code data 151. At S25, the registration server 100 transmits the created print data to the printer 110.

Upon receiving the print data from the registration server 100, the printer 110 at S26 controls the printing device 120 to print an image based on the print data. The image contains: a character string representing the URL 150; a two-dimensional code corresponding to the URL 150; and a message for prompting the user to operate the mobile terminal 10 to read the two-dimensional code. In the case where a PC is used instead of the mobile terminal 10, the image further contains a message for prompting the user to access the URL 150 to register the main account information.

At S110 in FIG. 4, the user operates the mobile terminal 10 to read the two-dimensional code. Specifically, the user instructs the camera 27 of the mobile terminal 10 to take the two-dimensional code. As a result, the mobile terminal 10 obtains the two-dimensional code data 151 corresponding to the two-dimensional code. It is noted that the user may input the URL 150 into the mobile terminal 10 via the button input device 17 instead of taking the two-dimensional code.

It is noted that in the case where the PC is used instead of the mobile terminal 10, the following processing may be executed at S110. Since common PCs do not have a function for reading the two-dimensional code, the user in most cases needs to input the URL 150 into the PC. However, in the case where the PC and the MFP 310 are connected to each other, for example, the PC can obtain, from the MFP 310, the two-dimensional code data obtained by reading of the two-dimensional code by the reading device of the MFP 310.

At S112, the mobile terminal 10 reads the two-dimensional code data 151 (i.e., the URL 150) to transmit a temporary-password input page request containing the URL 150 to the registration server 100. The temporary-password input page request is a signal for requesting temporary-password input page data. The temporary-password input page data represents a temporary-password input page containing an image for input of a temporary password. It is noted that the following communication to S136 always contains the query string "ac=aaa" representing the temporary account name "aaa", but a description indicating this may be omitted.

Upon receiving the temporary-password input page request, the registration server 100 at S114 transmits the temporary-password input page data to the mobile terminal 10.

Upon receiving the temporary-password input page data from the registration server 100, the mobile terminal 10 at S116 controls the panel 18 to display the temporary-password input page based on the temporary-password input page data.

At S118, the user inputs the temporary password "PWa" described on the card to the mobile terminal 10 via the button input device 17.

At S120, the mobile terminal 10 transmits the input temporary password "PWa" to the registration server 100.

Upon receiving the temporary password "PWa" from the mobile terminal 10, the registration server 100 at S122 transmits selection page data to the mobile terminal 10. The selection page data represents a selection page PG1 containing: a new registration button corresponding to a new registration mode; and an additional registration button corresponding to an additional registration mode. The new registration mode is a mode for registering a main account information unregistered in the registration server 100 and a serial number into the registration server 100 such that the main account information and the serial number are associated with each other. The additional registration mode is a mode for registering a main account information registered in the registration server 100 and a serial number into the registration server 100 such that the main account information and the serial number are associated with each other. In the present case, however, since no main account information is registered in the registration server 100, the additional registration button is displayed on the selection page PG1 such that selection of the additional registration button is disabled.

At S126, the user operates the button input device 17 of the mobile terminal 10 to select the new registration button. As a result, the new registration mode is selected.

At S128, the mobile terminal 10 sends the registration server 100 a new registration page request for requesting new registration page data. The new registration page data represents a new registration page PG2 containing an image for input of unregistered main account information.

Upon receiving the new registration page request from the mobile terminal 10, the registration server 100 at S 130 transmits the new registration page data to the mobile terminal 10.

Upon receiving the new registration page data from the registration server 100, the mobile terminal 10 at S132 controls the panel 18 to display the new registration page PG2 based on the new registration page data. The new registration page PG2 contains an image for input of the main account name, the main password, the personal information (i.e., information such as the name of the user, the address, the contact information, and the method of payment for services provided by the registration server 100). It is noted that FIG. 4 does not illustrate an image for input of the personal information other than the name of the user.

At S 134, the user operates the button input device 17 to input the main account information ACx to the mobile terminal 10, which main account information ACx contains the main account name "XXX", the main password "PWx", and the personal information PI1. The main account information ACx is information which can be determined by the user as needed.

At S136, the mobile terminal 10 transmits the main account information ACx and the temporary account name "aaa" to the registration server 100. Since the communication at S136 contains the query string "ac=aaa" representing the temporary account name "aaa" as described above, the mobile terminal 10 transmits the temporary account name "aaa" to the registration server 100 in other words.

Upon receiving the main account information ACx and the temporary account name "aaa" from the mobile terminal 10, the registration server 100 at S138 registers, into the storage 101, the main account information ACx, the temporary account information ACa containing the temporary account name "aaa", and the product information PR1 registered in association with the temporary account information ACa, such that the main account information ACx, the temporary account information ACa, and the product information PR1 are associated with each other.

Effects in Case A

As a configuration different from that in the present embodiment, a configuration in which the user registers the PIN code "123" into the registration server 100 is assumed.

It is noted that this configuration will be referred to as "comparative example". No PIN code is stored in the registration server 100 in the initial state in the comparative example. Also, the user does not have the card on which the PIN code "123" and the temporary password "PWa" are described. In the comparative example, the following processings and operations need to be performed in order to register the main account information ACx and the serial number "01" into the registration server 100 such that the main account information ACx and the serial number "01" are associated with each other. First, the user turns the printer 110 on to input the PIN code to the printer 110. However, the printer 110 notifies the user of a need of registration of the PIN code to the registration server 100 before input of the PIN code. Thus, after moving from the printer 110 to the mobile terminal 10, the user operates the mobile terminal 10 to instruct the registration server 100 to issue the PIN code. In response, the registration server 100 creates and registers the PIN code "123" and transmits the registered PIN code "123" to the mobile terminal 10, i.e., the user. Then, after moving from the mobile terminal 10 to the printer 110 again, the user inputs the received PIN code "123" to the printer 110 (at S18 in FIG. 3). Processings and operations similar to those at S19-S26 are then performed. Then, after moving from the printer 110 to the mobile terminal 10, the user operates the mobile terminal 10 reads a two-dimensional code printed on the sheet (at S110 in FIG. 4). Processings and operations similar to those at S112-S138 are then performed. As a result, the registration server 100 registers the main account information ACx and the product information PR1 in the state in which the main account information ACx and the product information PR1 are associated with each other. In this comparative example, the user moves between the printer 110 and the mobile terminal 10 three times, resulting in low convenience to the user. Furthermore, even if the user registers the PIN code into the registration server 100 before the printer 110 is turned on, the user moves between the printer 110 and the mobile terminal 10 twice.

In the present embodiment, the user performs the following operations to register the main account information ACx and the product information PR1 into the registration server 100. That is, the user turns the printer 110 on (at S8 in FIG. 3) and then inputs the PIN code "123" to the printer 110 (S10). The user moves from the printer 110 to the mobile terminal 10, operates the mobile terminal 10 to read the two-dimensional code printed on the sheet (at S110 in FIG. 4), inputs the temporary password "PWa" (S118), selects the new registration mode (S126), and inputs the main account information ACx (S134). Thus, the user only needs to move between the printer 110 and the mobile terminal 10 once to register the main account information ACx and the serial number "01" into the registration server 100. According to the present embodiment, the registration server 100 achieves improved convenience to the user in registration of the main account information ACx and the product information PR1 to the registration server 100.

In the present embodiment, the user can operate the mobile terminal 10 to obtain the two-dimensional code data 151 (i.e., the URL 150) by instructing the mobile terminal 10 to read the two-dimensional code instead of inputting the URL 150 to the mobile terminal 10 (at S110 in FIG. 4). As a result, the registration server 100 can achieve further improved convenience to the user.

Case B1

Figure 5:
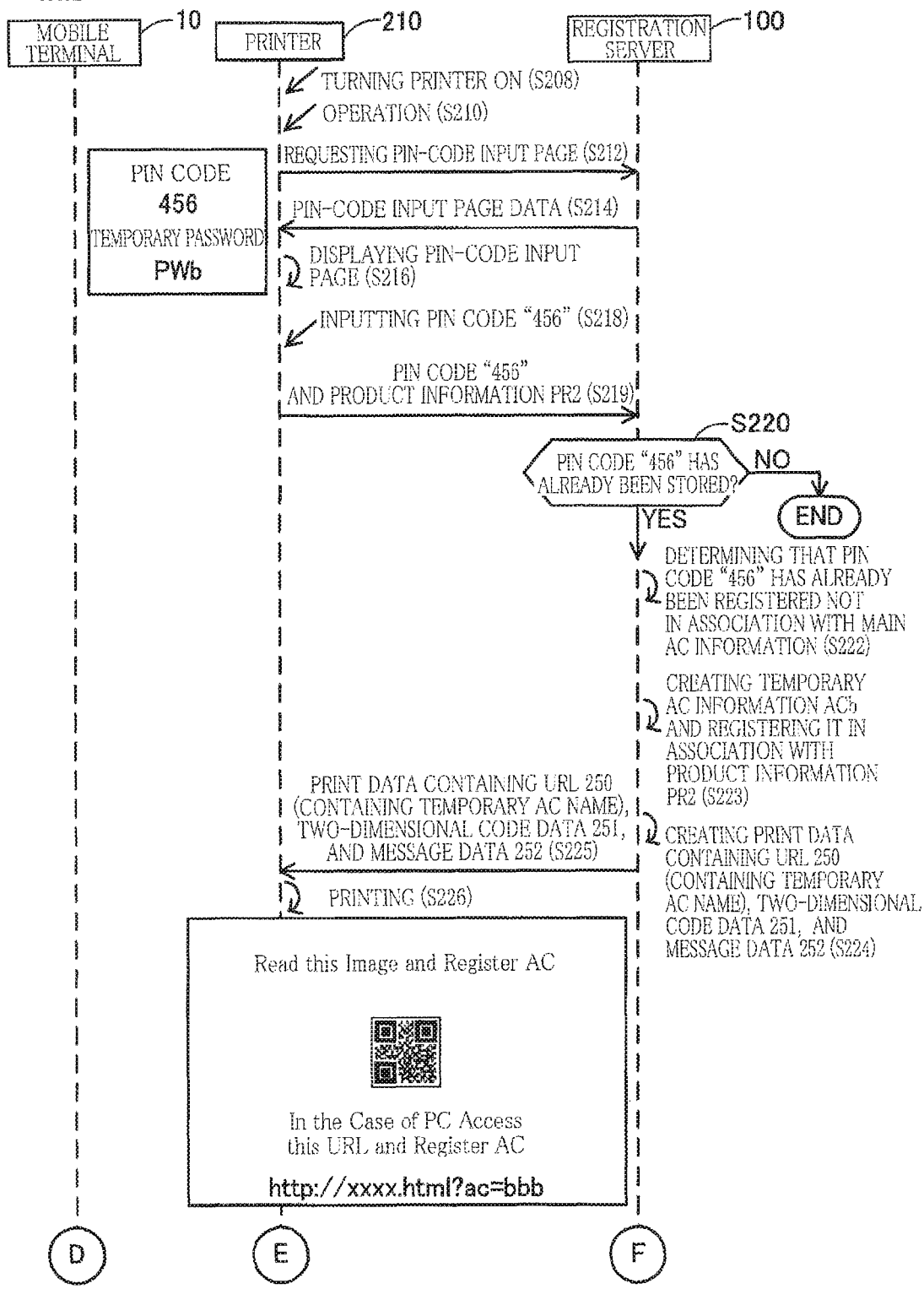
FIG. 5 is a sequence diagram illustrating a case B in which product information about a second printer is registered.
Figure 6:
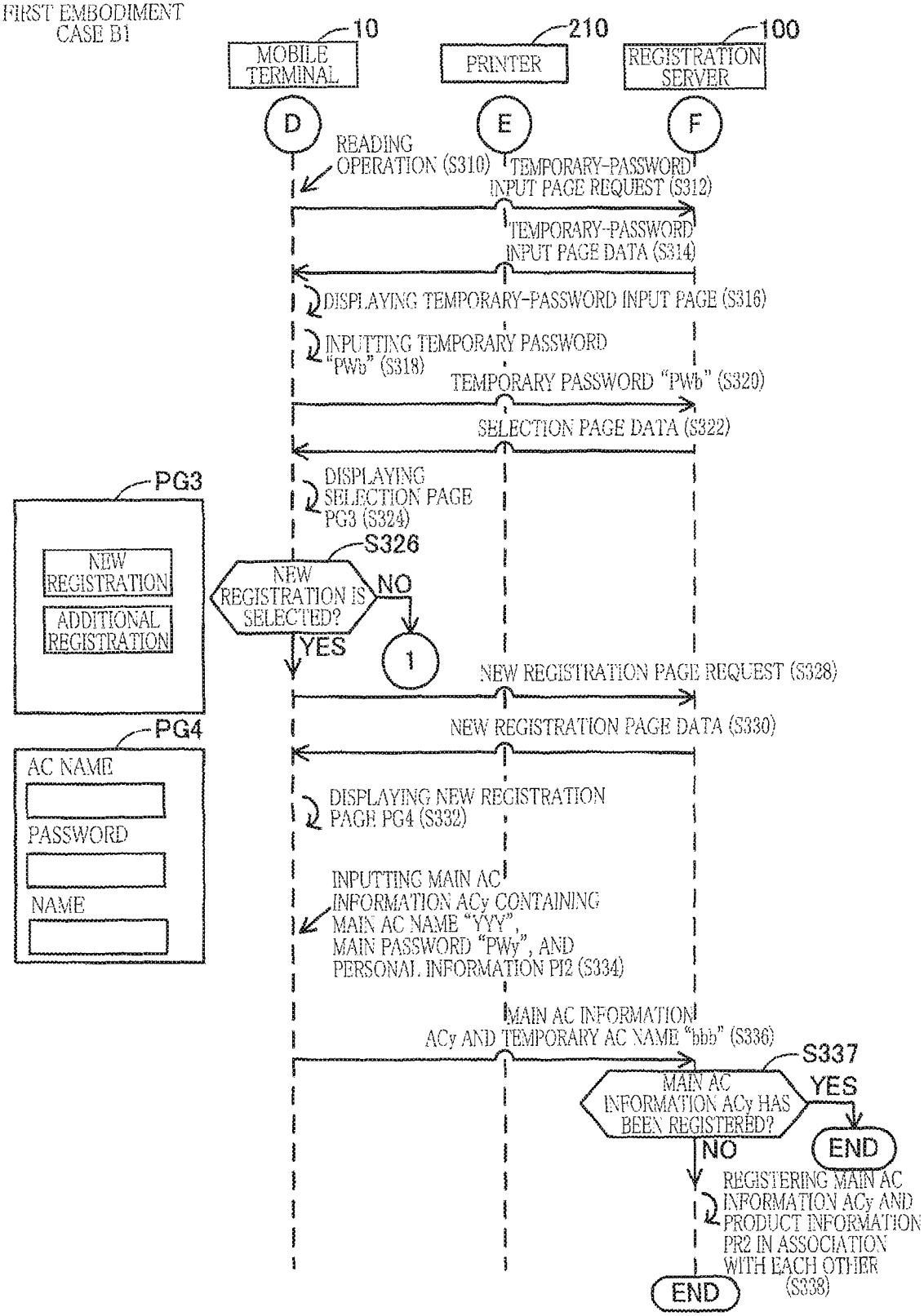
FIG. 6 is a sequence diagram illustrating a case B1 in which new registration is selected.

There will be next explained, with reference to FIGS. 5 and 6, a case B1 in which the product information PR2 about the printer 210 is newly registered. In the initial state of the case B1, the main account information ACx, the temporary account information ACa, and the product information PR1 are registered in the registration server 100 in association with each other. The user has a card on which the PIN code "456" (as one example of a second particular code) and the temporary password "PWb" are described. Processings at S208-S216 are similar to those at S8-S16 in FIG. 3.

At S218, the user inputs the PIN code "456" described on the card to a user interface, not illustrated, of the printer 210.

At S219, the printer 210 reads the product information PR2 containing the serial number "02" and the product name "M2" from a storage, not illustrated, of the printer 210 and transmits the PIN code "456" and the product information PR2 to the registration server 100.

Upon receiving the PIN code "456" and the product information PR2 from the printer 210, the registration server 100 at S220 determines whether any of the two PIN codes stored in the storage of the printer 210 matches the PIN code "456" transmitted with the received product information PR2. In the present case, a positive decision (YES) is made at S220 because one of the two PIN codes stored in the storage coincides with the PIN code "456". When none of the two PIN codes stored in the storage coincides with the PIN code "456", a negative decision (NO) is made at S220, and the process in FIG. 5 ends.

At S222, the registration server 100 determines that the PIN code "456" has already been registered not in associated with the main account information. At S223, the registration server 100 creates the temporary account name "bbb" and the temporary password "PWb" and uses the temporary account name "bbb", the temporary password "PWb", and the stored PIN code "456" to create the temporary account information ACb (as one example of second corresponding information). Also, the registration server 100 registers the created temporary account information ACb and the product information PR2 into the storage 101 such that the created temporary account information ACb and the product information PR2 are associated with each other. At S224, the registration server 100 creates print data containing a URL 250, two-dimensional code data 251, and message data 252. The URL 250 is similar to the URL 150. The URL 250 contains a query string "ac=bbb" representing the temporary account name "bbb". The data 251, 252 are similar to the respective data 151, 152. At S225, the registration server 100 transmits the created print data to the printer 210. A processing at S226 is similar to that at S26 in FIG. 3.

Processings at S310-S316 are similar to those at S110-S116 in FIG. 4. At S318, the user inputs the temporary password "PWb" described on the card to the button input device 17 of the mobile terminal 10.

At S320, the mobile terminal 10 transmits the input temporary password "PWb" to the registration server 100.

A processing at S322 is similar to that at S122 in FIG. 4. The selection page data represents a selection page PG3 containing: the new registration button corresponding to the new registration mode and the additional registration button corresponding to the additional registration mode. In the present case, since the main account information ACx has been registered in the registration server 100, the additional registration button is displayed on the selection page PG3 such that selection of the additional registration button is enabled. A processing at S324 is similar to that at S124 in FIG. 4.

At S326, the mobile terminal 10 determines whether the user operates the button input device 17 of the mobile terminal 10 to select the new registration button. In the present case, since the new registration button is selected, a positive decision (YES) is made at S326, this process goes to S328. It is noted that the case where the additional registration button is selected will be described later as a case B2. Processings at S328-S332 are similar to those at S128-S132 in FIG. 4. A new registration page PG4 displayed at S332 is similar to the new registration page PG2.

At S334, the user operates the button input device 17 to input the main account information ACy to the mobile terminal 10, which main account information ACy contains the main account name "YYY", the main password "PWy", and the personal information PI2.

At S336, the mobile terminal 10 transmits the main account information ACy and the temporary account name "bbb" to the registration server 100. Since the communication at S336 contains the query string "ac =bbb" representing the temporary account name "bbb" as described above, the mobile terminal 10 transmits the temporary account name "bbb" to the registration server 100 in other words.

Upon receiving the main account information ACy and the temporary account name "bbb" from the mobile terminal 10, the registration server 100 at S337 determines whether the main account information ACy has been registered in the storage 101. In the present case, the registration server 100 determines that the main account information ACy has not been registered in the storage 101 (S337: NO), and this process goes to S338. At S338, the registration server 100 registers the main account information ACy and the product information PR2 into the storage 101 such that the main account information ACy and the product information PR2 are associated with each other. When the main account information ACy has been registered in the storage 101, a positive decision (YES) is made at S337, and the process in FIG. 6 ends.

Effects in Case B1

In the present case, when the user selects the new registration in a situation in which the main account information ACx and the product information PR1 are registered in the registration server 100 in association with each other (S326: YES in FIG. 6), the product information PR2 about the printer 210 can be newly registered (S338).

Case B2

Figure 7:
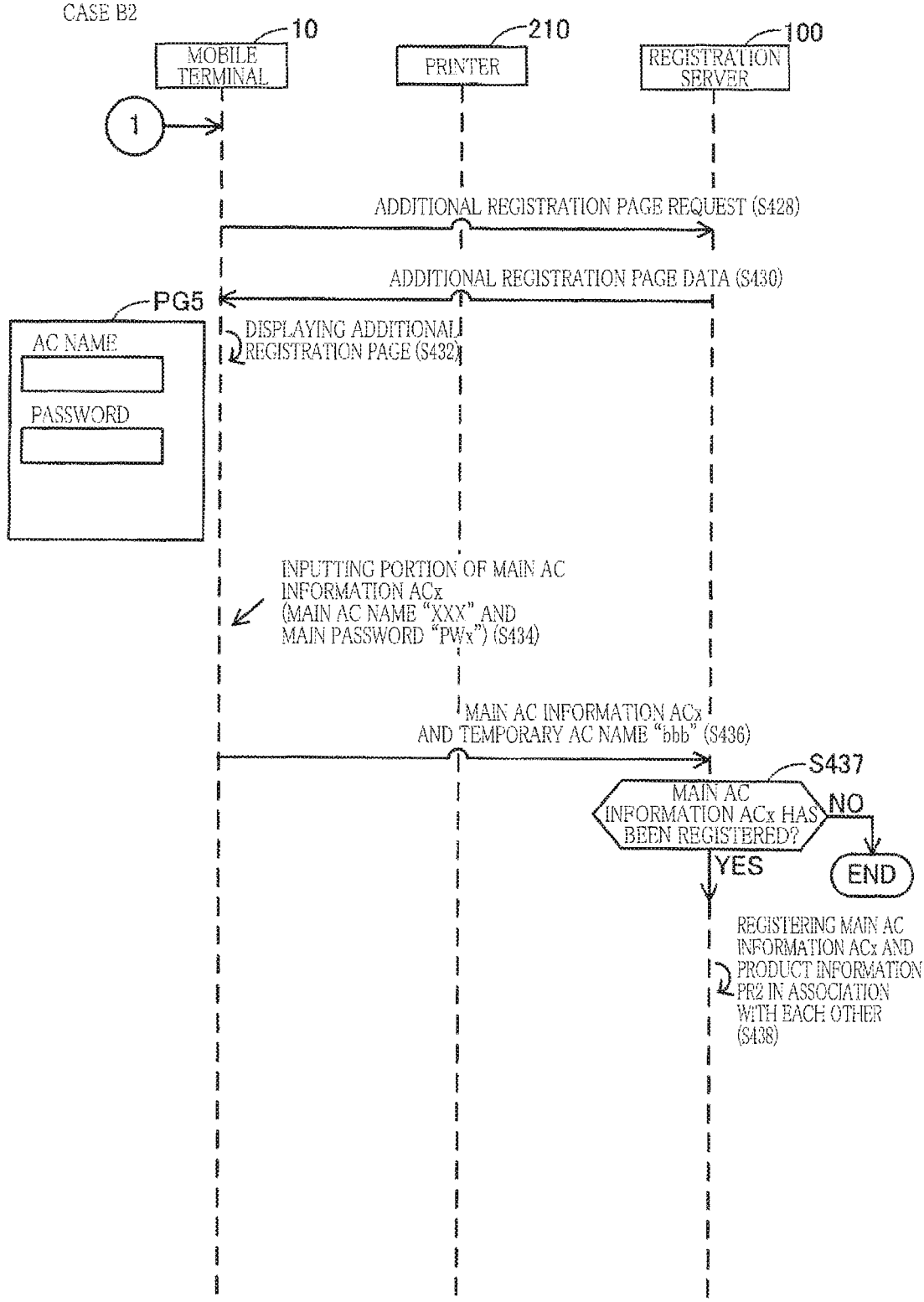
FIG. 7 is a sequence diagram illustrating a case B2 in which additional registration is selected.

There will be next explained, with reference to FIGS. 5-7, the case B2 in which the product information PR2 about the printer 210 is additionally registered. Processings S208-S324 in the present case are similar to those in the case B1. In the present case, the additional registration button is selected. Thus, a negative decision (NO) is made at S326, and the process goes to S428 in FIG. 7.

At S428, the mobile terminal 10 sends the registration server 100 an additional registration page request for requesting additional registration page data. The additional registration page data represents an additional registration page PG5 containing an image for input of a portion of registered main account information.

Upon receiving the additional registration page request from the mobile terminal 10, the registration server 100 at S430 transmits the additional registration page data to the mobile terminal 10.

Upon receiving the additional registration page data from the registration server 100, the mobile terminal 10 at S432 controls the panel 18 to display the additional registration page PG5 based on the additional registration page data. The additional registration page PG5 contains an image for input of the main account name and the main password and does not contain an image for input of the personal information.

At S434, the user operates the button input device 17 to input a portion of the registered main account information ACx (i.e., the main account name "XXX" and the main password "PWx") to the mobile terminal 10.

At S436, the mobile terminal 10 transmits the main account information ACx and the temporary account name "bbb" to the registration server 100. Since the communication at S436 contains the query string "ac=bbb" representing the temporary account name "bbb", the mobile terminal 10 transmits the temporary account name "bbb" to the registration server 100 in other words.

Upon receiving the main account information ACx and the temporary account name "bbb" from the mobile terminal 10, the registration server 100 at S437 determines whether the main account information ACx has been registered in the storage 101. In the present case, the registration server 100 determines that the main account information ACx has been registered in the storage 101 (S437: YES), and this process goes to S438. The registration server 100 identifies the product information PR2 registered in association with the temporary account information ACb containing the temporary account name "bbb" and at S438 registers the main account information ACx and the product information PR2 into the storage 101 such that the main account information ACx and the product information PR2 are associated with each other.

Effects in Case B2

In the present case, when the user selects the additional registration in a situation in which the main account information ACx and the product information PR1 are registered in the registration server 100 in association with each other (S326: NO in FIG. 6), the product information PR2 can be additionally registered (S438 in FIG. 7).

Case C

Figure 8:
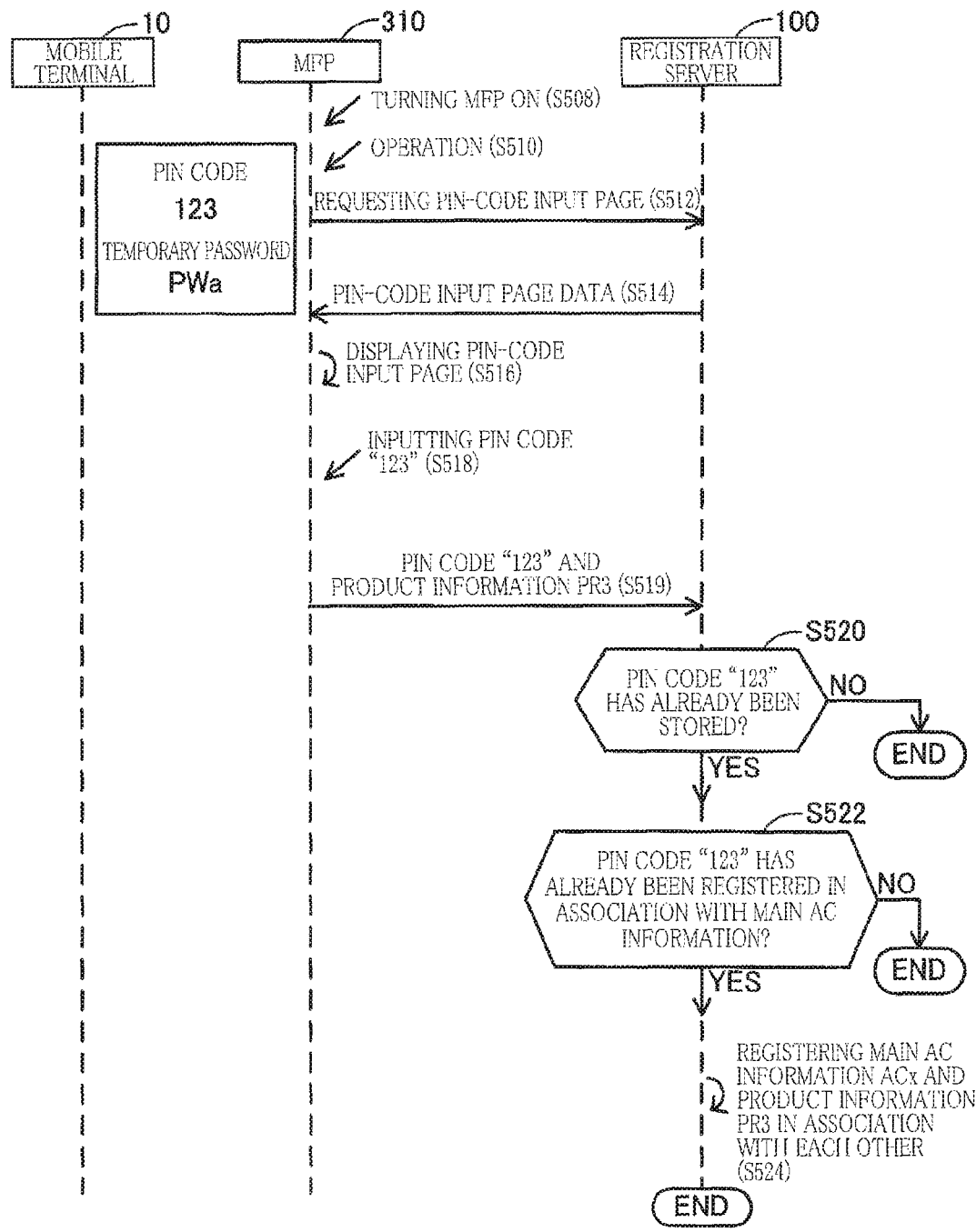
FIG. 8 is a sequence diagram illustrating a case C in which product information about a multi-function peripheral (MFP) is registered.

There will be next explained, with reference to FIG. 8, a case C in which the product information PR3 about the MFP 310 is additionally registered. The initial state in the case C is similar to the initial state in the case B1. Processings at S508-S518 are similar to those at S8-S18 in FIG. 3. At S519, the MFP 310 reads the product information PR3 containing the serial number "03" and the product name "M3" from a storage, not illustrated, of the MFP 310 and transmits the PIN code "123" and the product information PR3 to the registration server 100.

A processing at 5520 is similar to that at S20 in FIG. 3. At 5522, the registration server 100 determines whether the PIN code "123" has been registered in association with the main account information. In the present case, since the PIN code "123" is registered in association with the main account information ACx, a positive decision (YES) is made at S522, and this process goes to S524. At S524, the registration server 100 registers the main account information ACx and the product information PR3 into the storage 101 such that the main account information ACx and the product information PR3 are in association with each other.

Effects in Case C

In the present case, the registration server 100 can use the PIN code "123" to register the main account information ACx and the product information PR3 about the MFP 310 such that the main account information ACx and the product information PR3 about the MFP 310 are associated with each other (S524).

Second Embodiment

There will be next explained a second embodiment. In the present embodiment, the temporary account information is not registered into the registration server 100. The printer 110 displays an image on the display 114 instead of printing an image based on the print data.

Case D

Figure 9:
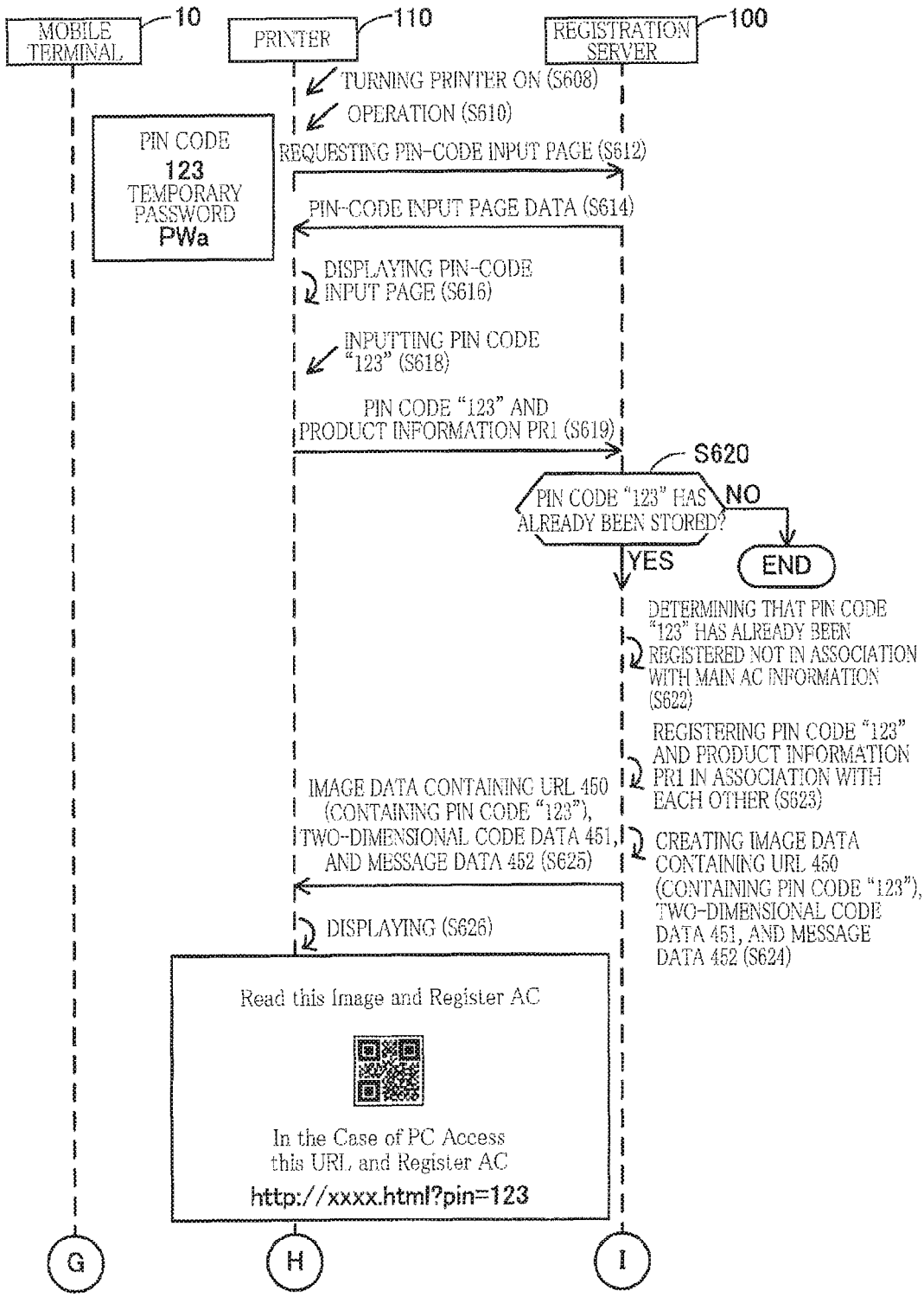
FIG. 9 is a sequence diagram illustrating a case D in a second embodiment.

There will be explained, with reference to FIGS. 9 and 10, a case D in which the main account information ACx and the product information PR1 about the printer 110 are registered in association with each other. Processings at S608-S622 in FIG. 9 are similar to those at S8-S22 in FIG. 3. At S623, the registration server 100 registers the PIN code "123" and the product information PR1 such that the PIN code "123" and the product information PR1 are associated with each other. At S624, the registration server 100 creates image data containing a URL 450, two-dimensional code data 451, and message data 452. The URL 450 contains a query string "pin=123" representing the PIN code "123". The two-dimensional code data 451 is data having the same information as contained in the URL 450. The message data 452 is similar to the message data 152. At S625, the registration server 100 transmits the created image data to the printer 110.

Upon receiving the image data from the registration server 100, the printer 110 at S626 controls the display 114 to display an image based on the image data.

Figure 10:
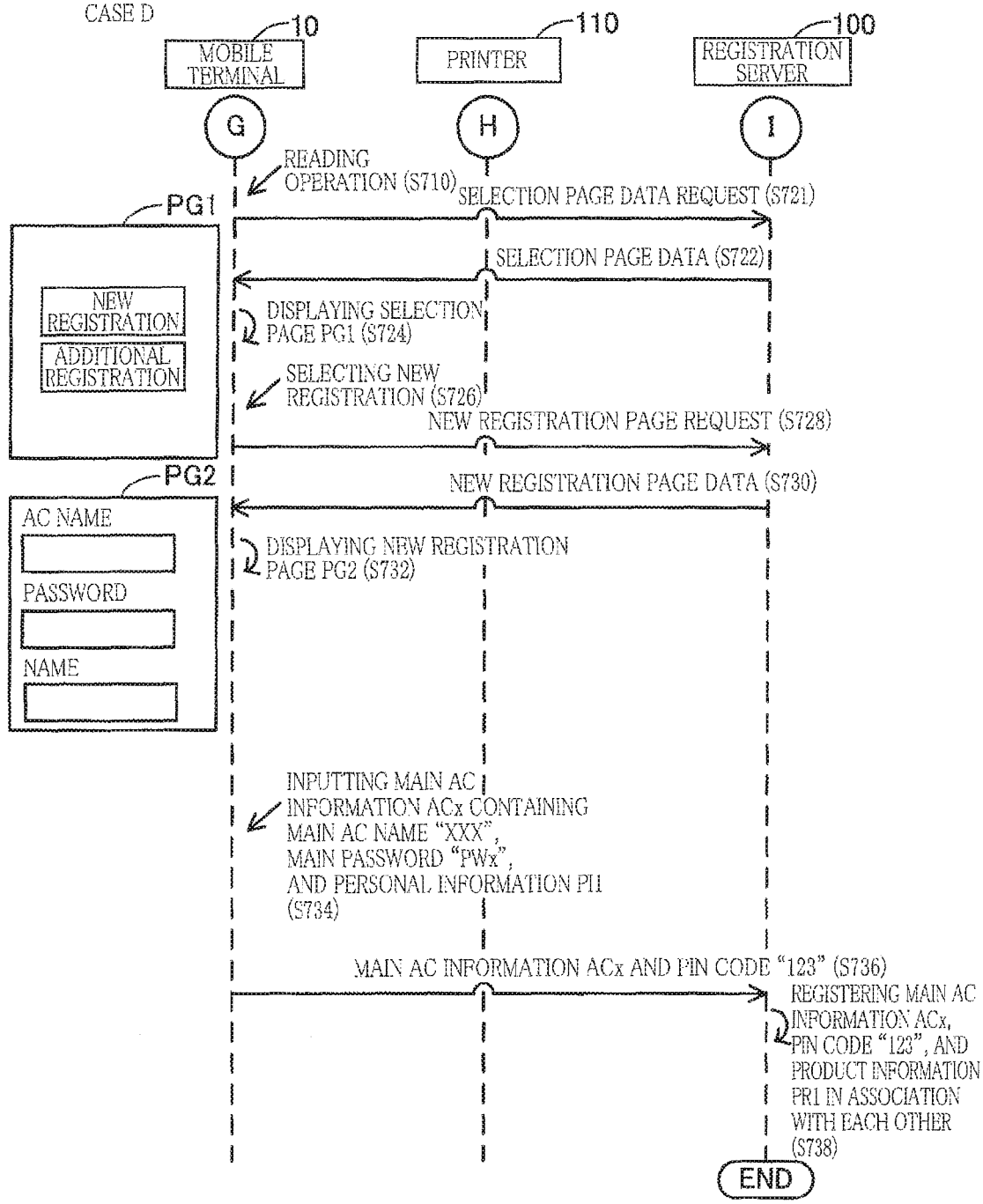
FIG. 10 is a sequence diagram continued from FIG. 9.

A processing at S710 in FIG. 10 is similar to that at S110 in FIG. 4. However, the two-dimensional code is read not on the printing sheet but on the display 114 of the printer 110.

At S721, the mobile terminal 10 accesses the two-dimensional code data 451 (i.e., the URL 450) to transmit a selection page data request containing the URL 450 to the registration server 100. It is noted that the following communication to S736 always contains the query string "pin=123" representing the PIN code "123".

Processings at S722-S734 are similar to those at S122-S134 in FIG. 4. At S736, the mobile terminal 10 transmits the main account information ACx and the PIN code "123" to the registration server 100. Since the communication at S736 contains the query string "pin=123" representing the PIN code "123" as described above, the mobile terminal 10 transmits the PIN code "123" to the registration server 100 in other words.

Upon receiving the main account information ACx and the PIN code "123" from the mobile terminal 10, the registration server 100 identifies the registered product information PR1 based on the PIN code "123". The registration server 100 at S738 registers, into the storage 101, the main account information ACx, and the PIN code "123", the identified product information PR1 such that the main account information ACx, the PIN code "123", and the identified product information PR1 are associated with each other. s Effects in Case D In the present embodiment, the registration server 100 need not execute the processing for creating the temporary account information (S23 in FIG. 3) and the processing relating to the temporary password (S112, S114, and S120 in FIG. 4), resulting in reduction in load of processings. Also, the registration server 100 need not register the temporary account information, resulting in reduction in load of the storage 101.

Third Embodiment

In the present embodiment, the printer 110 uses the wireless communication 201 to transmit the URL 150 to the mobile terminal 10 instead of the processings at S26 in FIG. 3 and at S110 in FIG. 4. In the present embodiment, even in the case where the user does not instruct the printer 110 to transmit the URL 150 to the mobile terminal 10, the printer 110 uses the wireless communication 201 (e.g., a tethering function) to transmit the URL 150 to the mobile terminal 10. This configuration can improve convenience to the user. In a modification, wired communication using a wired cable (e.g., a universal serial bus (USB) cable) may be used instead of the wireless communication 201.

While the embodiments have been described above, it is to be understood that the disclosure is not limited to the details of the illustrated embodiments, but may be embodied with various changes and modifications, which may occur to those skilled in the art, without departing from the spirit and scope of the disclosure.

Modifications

A character string may be used as the password instead of the PIN code. Any kinds of authentication information may be used as the code.

The print data created at S24 in FIG. 3 may contain only one of the URL 150 and the two-dimensional code data 151.

The image processing devices are not limited to the printers and the MFP and may be any devices, such as a scanner, capable of performing an image processing. The information processing device is not limited to the mobile terminal and may be any of a tablet computer, a laptop PC, and a desktop PC, for example.

The OS 21c is not limited to Android OS and may be any of iOS® (registered trademark of Cisco Systems, Inc.) and Windows Phone® (registered trademark of Microsoft Corporation), for example. The encoded data is not limited to the two-dimensional code data and may be a one-dimensional code such as a bar code, for example.

The print data created at S24 in FIG. 3 contains the URL 150 containing the query string "ac=aaa" but may contain the temporary account name "aaa" and the URL 150 not containing the query string "ac=aaa". The first corresponding information may not be information represented in the form of a query string.

The printer 110 transmits the URL 150 to the mobile terminal 10 over the wireless communication 201 using Wi-Fi Direct in the above-described embodiments. However, this wireless communication 201 may use any kind of wireless communication technique such as Wi-Fi and Near Field Communication (NFC).

In the above-described embodiments, each of the respective CPUs 11, 102 of the mobile terminal 10 and the registration server 100 executes the processings in FIGS. 3-10 by executing the programs stored in the storages 12, 101. Instead of this configuration, at least one of the processings in FIGS. 3-10 may be achieved by hardware such as a logic circuit.

The technical components described in the present specification or the drawings exhibit technical utility alone or in various combinations, and are not limited to the combinations disclosed in the claims at the time of application. Furthermore, the techniques illustrated in the present specification or the drawings may simultaneously achieve a plurality of objects, and have technical utility by achieving one of these objects.

What is claimed is:

1. A server, comprising:
   a communication interface configured to communicate with a plurality of image processing devices and an information processing device over a network;
   a storage configured to store at least one code; and a controller configured to perform:
  obtaining first identification information and a first particular code from a first image processing device, the first identification information identifying the first image processing device that is one of the plurality of image processing devices, the first particular code being input to the first image processing device by a user;
  determining whether the obtained first particular code is identical to one of the at least one code stored in the storage;
  in response to determining that the obtained particular code is identical to one of the at least one code, transmitting first corresponding information to the first image processing device, the first corresponding information corresponding to the first particular code;
  receiving first user account information and the first corresponding information from the information processing device, the first user account information being input to the information processing device by the user, the first corresponding information having been transmitted from the first image processing device to the information processing device; and
  registering the received first user account information and the first identification information identified by the received first corresponding information, into the storage in association with each other.

2. The server according to claim 1,
wherein the controller is further configured to transmit encoded data and print data to the first image processing device when the controller determines that the obtained first particular code is identical to one of the at least one code stored in the storage,
wherein the encoded data indicates an encoded code that specifies a location of a first web page on the network, and the first web page is for inputting the user account information, and
wherein the print data contains a message that prompts the user to activate the information processing device to read the encoded code.

3. The server according to claim 1,
wherein the controller is further configured to transmit encoded data and display data to the first image processing device when the controller determines that the obtained first particular code is identical to one of the at least one code stored in the storage,
wherein the encoded data indicates an encoded code that specifies a location of a first web page on the network, and the first web page is for inputting the user account information, and
wherein the display data contains a message that prompts the user to activate the information processing device to read the encoded code displayed on a display of the first image processing device.

4. The server according to claim 2, wherein the encoded data indicates a two-dimensional code.

5. The server according to claim 1,
wherein the controller is further configured to:
  obtain second identification information and a second particular code from a second image processing device after the first identification information and the first user account information are registered into the storage in association with each other, the second image processing device being different from the first image processing device, the second identification information identifying the second image processing device, the second particular code being input to the second image processing device by the user;
  determine whether the second particular code is one of the at least one code stored in the storage; and
  transmit specifying information to the second image processing device when the controller determines that the second particular code is one of the at least one code, the specifying information specifying a location of a second web page on the network, the second web page being for inputting second user account information corresponding to second corresponding information, the second corresponding information corresponding to the second particular code,
wherein the second web page contains a selection page for selection of any one of a new registration mode and an additional registration mode by the user,
wherein in the new registration mode the second identification information and the second user account information different from the first user account information having been registered are registered into the storage in association with each other, and
wherein in the additional registration mode the second identification information and the first user account information having been registered are registered into the storage in association with each other.

6. The server according to claim 5,
wherein the second web page contains a new registration page that is displayed on a display of the second image processing device when the new registration mode is selected on the selection page,
wherein the new registration page contains an image for inputting the second user account information, and
wherein the controller is further configured to:
  receive, from the information processing device, (i) the second corresponding information provided from the second image processing device to the information processing device and (ii) the second user account information displayed on the information processing device and input by the user on the new registration page; and
  in response to receiving the second corresponding information and the second user account information from the information processing device, register the received second user account information and the second identification information identified by the received second corresponding information into the storage such that the received second user account information and the second identification information are associated with each other.

7. The server according to claim 5,
wherein the second web page contains an additional registration page that is displayed on a display of the second image processing device when the additional registration mode is selected on the selection page,
wherein the additional registration page contains an image for inputting a portion of the first user account information,
wherein the controller is further configured to:
  receive, from the information processing device, (i) the second corresponding information provided from the second image processing device to the information processing device and (ii) the portion of the first user account information which is displayed on the information processing device and input by the user on the additional registration page; and in response to receiving the second corresponding information and the portion of the first user account information from the information processing device, register the first user account information and the second identification information identified by the received second corresponding information into the storage such that the first user account information and the second identification information are associated with each other.

8. The server according to claim 1, wherein the controller is further configured to:
register the first user account information and the first particular code into the storage such that the first user account information and the first particular code are associated with each other;
after the first user account information, the first identification information, and the first particular code are registered in association with each other, obtain, from a third image processing device, third identification information about the third image processing device and the first particular code input by the user;
in response to obtaining the first particular code and the third identification information from the third image processing device, register the third identification information and the first user account information registered in association with the first particular code into the storage such that the third identification information and the first user account information are associated with each other.

9. The server according to claim 1, wherein the first corresponding information is a query string.

10. The server according to claim 1,
wherein the server is configured to perform wireless communication with the information processing device via the first image processing device, and
wherein the controller is configured to transmit the first corresponding information to the information processing device over the wireless communication.

11. A communication system, comprising:
a server; and
a first image processing device,
the server comprising:
a communication interface configured to communicate with a plurality of image processing devices and an information processing device over a network, the plurality of image processing devices comprising the first image processing device;
a storage configured to store at least one code; and
a controller configured to perform:
obtaining first identification information and a first particular code from the first image processing device, the first identification information identifying the first image processing device, the first particular code being input to the first image processing device by a user;
determining whether the obtained first particular code is identical to one of the at least one code stored in the storage;
in response to determining that the obtained particular code is identical to one of the at least one code, transmitting first corresponding information to the first image processing device, the first corresponding information corresponding to the first particular code;
receiving first user account information and the first corresponding information from the information processing device, the first user account information being user account information that is input to the information processing device by the user, the first corresponding information having been transmitted from the first image processing device to the information processing device; and
registering the received first user account information and the first identification information identified by the received first corresponding information, into the storage in association with each other.

* * * * *